United States Patent

Craaikamp

[11] Patent Number: 5,813,908
[45] Date of Patent: Sep. 29, 1998

[54] APPARATUS FOR DEBONING A LEG OF SLAUGHTERED POULTRY COMPRISING UPPER LEG AND LOWER LEG

[75] Inventor: Jacob Jan Van Craaikamp, Oostzaan, Netherlands

[73] Assignee: Machinefabriek Meyn B.V., Oostzaan, Netherlands

[21] Appl. No.: 839,084

[22] Filed: Apr. 23, 1997

[30] Foreign Application Priority Data

Apr. 23, 1996 [NL] Netherlands ............................ 1002924

[51] Int. Cl.⁶ .................................................. A22C 17/04
[52] U.S. Cl. ............................................................ 452/136
[58] Field of Search ................................. 452/136, 138, 452/135

[56] References Cited

U.S. PATENT DOCUMENTS

| | | |
|---|---|---|
| 4,216,565 | 8/1980 | Volk et al. . |
| 4,377,884 | 3/1983 | Viscolosi . |
| 4,380,849 | 4/1983 | Adkison et al. . |
| 4,488,332 | 12/1984 | Atteck et al. ............................ 452/136 |
| 4,669,150 | 6/1987 | Manmoto et al. ....................... 452/136 |
| 4,811,456 | 3/1989 | Heuvel .................................... 452/136 |
| 4,944,067 | 7/1990 | Kulishev et al. . |
| 5,030,163 | 7/1991 | Mielnik . |
| 5,064,403 | 11/1991 | Elsten ...................................... 452/138 |
| 5,090,940 | 2/1992 | Adkison .................................. 452/138 |

FOREIGN PATENT DOCUMENTS

| | | |
|---|---|---|
| 0362457A1 | 4/1990 | European Pat. Off. . |
| 0465258A1 | 1/1992 | European Pat. Off. . |
| 4320241A1 | 12/1994 | Germany . |
| 29603797 | 5/1996 | Germany . |
| 9403070 | 2/1994 | WIPO . |

OTHER PUBLICATIONS

Dutch Search Report Dated Dec. 16, 1996.
EPO Search Report, Jul. 30, 1997.

Primary Examiner—Willis Little
Attorney, Agent, or Firm—Dority & Manning

[57] ABSTRACT

The invention relates to an apparatus for deboning a leg of slaughtered poultry comprising upper leg and lower leg, with a device to stretch the leg, a stripping diaphragm and a hollow tube movable to and fro for pushing the leg through the diaphragm and receiving the upper leg or lower leg up to the knee joint while engaging between the bone and the meat of said respective leg part. The hollow tube is at its frontal edge provided with a projecting part which can engage over the knee-cap of the knee joint. Thus, it is prevented that the knee-cap together with the meat is torn off the bone. Preferably the projecting part is an arcuate extension of the cylindrical wall of the hollow tube.

10 Claims, 3 Drawing Sheets

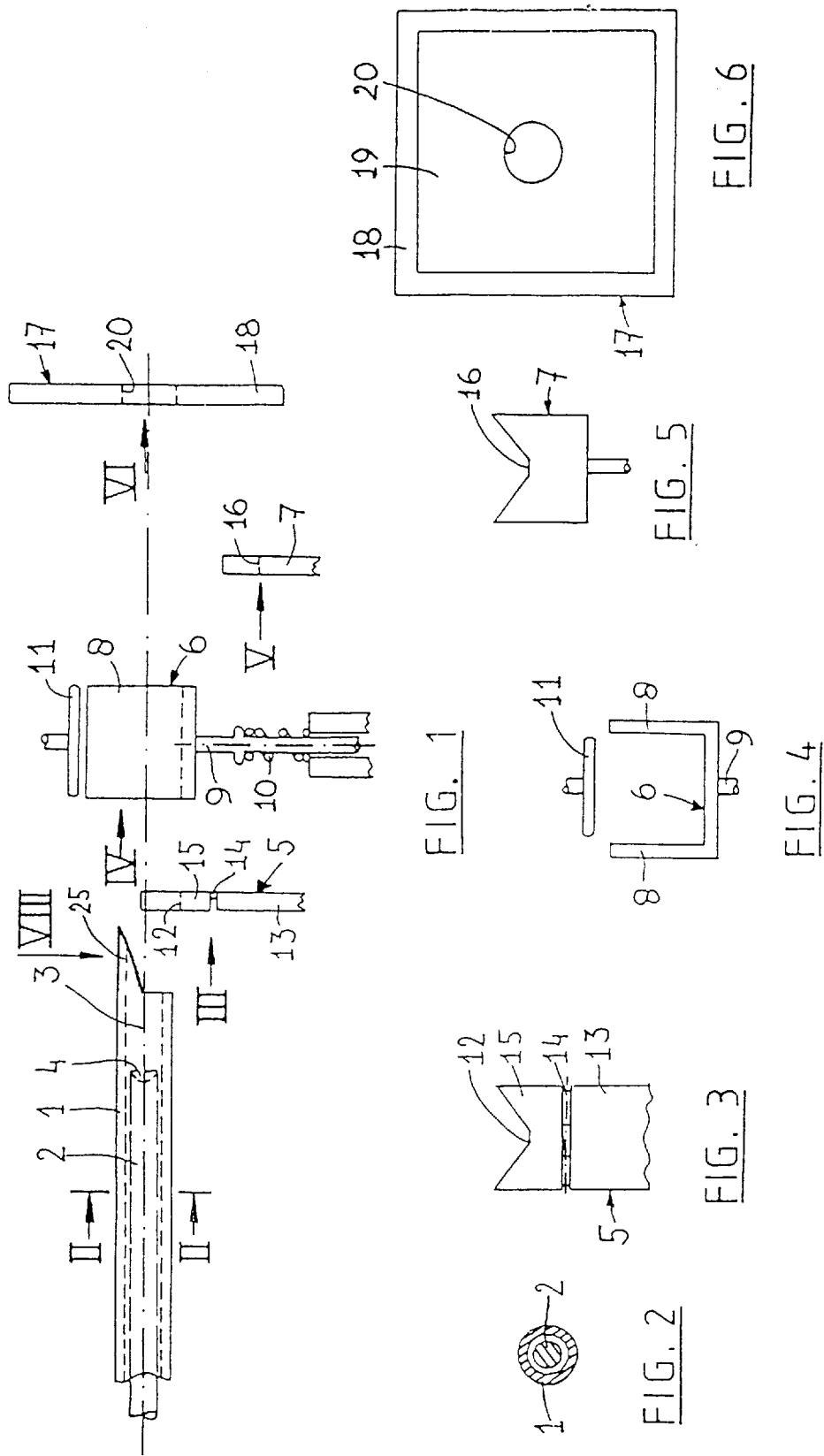

1

APPARATUS FOR DEBONING A LEG OF SLAUGHTERED POULTRY COMPRISING UPPER LEG AND LOWER LEG

The invention relates to an apparatus for deboning a leg of slaughtered poultry comprising upper leg and lower leg connected by the knee joint, with means for stretching the leg, a stripping diaphragm and a hollow tube movable to and fro for pushing the leg through the diaphragm and receiving the upper leg or lower leg up to the knee joint while engaging between the bone and the meat of said respective leg part.

Such an apparatus is described in an earlier Dutch patent application in the name of applicant. When, using said apparatus, the leg is deboned, there is a risk that together with the meat also the knee-cap is torn off of the knee joint. As a result the knee-cap remains in the meat, thus making it necessary to remove said knee-cap from the meat afterwards, usually by means of costly manual operations. Further the risk occurs, that together with the knee-cap fragments of tendons, bones and alike remain in the meat.

It is an object of the invention to provide an apparatus of the type referred to above, using which said disadvantages can be prevented in a simple, but nevertheless effective way.

Thus, according to the invention the apparatus is characterised in that the hollow tube at its frontal edge is provided with a projecting part which can engage over the knee-cap of the knee joint. In the situation, in which the hollow tube with its leading edge engages the knee joint of the leg, the projecting part covers the knee-cap. Like this the knee-cap is protected against the stripping action of the stripping diaphragm, such that the knee-cap remains connected to the bone and the meat is fully free of undesired irregularities.

In correspondence with a preferred embodiment of the apparatus according to the invention, the projecting part is an arcuate extension of the cylindrical wall of the hollow tube. The cylindrical shape of the projecting part closely matches the shape of the knee-cap and snugly encloses it. The arcuate shape promotes the entrance of the projecting part between the knee-cap and surrounding meat.

Hereinafter the invention will be elucidated referring to the drawing, in which an embodiment of the apparatus according to the invention is represented.

FIG. 1 shows, extremely schematically, an embodiment of the apparatus according to the invention in a side-elevational view, in an arbitrary position, FIG. 2 shows a section according to II—II in FIG. 1;

FIG. 3 shows a view according to III in FIG. 1;

FIG. 4 shows a view according to IV in FIG. 1;

FIG. 5 shows a view according to V in FIG. 1;

FIG. 6 shows a view according to VI in FIG. 1;

Figure 7A:
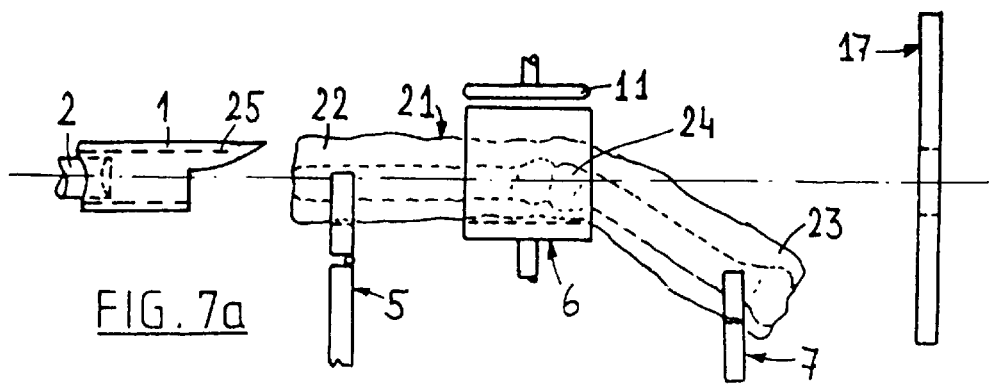
FIG. 7 shows the apparatus represented in FIG. 1 during a number of successive stages while carrying out the method according to the invention.

Before starting with a detailed description of the apparatus schematically represented in FIG. 1 the following is noted. As far is being movable the parts of the apparatus are driven by driving mechanisms not shown in detail. A number of different constructive solutions are available for this; by way of example the provision of cooperating followers and curved tracks is mentioned. As is further common in apparatus for processing slaughtered poultry, a number of the apparatus to be described can be combined in a carousel-like device carrying at its circumference the apparatus described.

For the sake of clarity hereinafter only those parts of the apparatus are illustrated which are essential for a direct understanding of the invention.

The apparatus shown in a side-elevational view in FIG. 1 for deboning a leg of slaughtered poultry comprises driving means shown left, including a hollow tube 1 and an expelling rod 2 coaxially therein. The hollow tube 1 and expelling rod 2 are independently movable to and fro in the direction of the center line 3. The expelling rod 2 comprises at its forward end a recess 4.

At its frontal edge the hollow tube 1 is provided with a projecting part 25 which defines an arcuate extension of the cylindrical wall of the hollow tube 1. This projecting part has been illustrated in a top plan view in correspondence with VIII in FIG. 1.

In FIG. 2 a section according to II—II through the hollow tube 1 and through the expelling rod 2 is illustrated.

At the right hand of the driver means 1 and 2 positioning means 5, 6 and 7 are provided. These include firstly a central positioning means 6 which, as shown also in the view according to FIG. 4, includes an uppermost positioning gutter 8 and a rod 9 carrying said gutter 8. The central positioning means 6 can move down upward and downward in a limited manner against the spring-load of a spring 10.

Above the central positioning means 6 a restricting plate 11 is provided which also can move upward and downward and which in a way to be described later can cooperate with the central positioning means 6.

The auxiliary positioning means 5 positioned in front of the central positioning means 6 comprises at its upper side a V-shaped recess 12 (see FIG. 3). For a reason to be explained later the auxiliary positioning means 5 preferably includes a lowermost stationary part 13 and an uppermost part 15 pivotable around a pivot axis 14.

Behind the central positioning means 6 the second auxiliary positioning means 7 is provided which, as shows FIG. 5, comprises at its upper side also a V-shaped recess 16. This second auxiliary positioning means 7 is mounted movably upward and downward in the apparatus.

Further the essential parts of the apparatus include a stripping diaphragm 17. As schematically represented in the view according to FIG. 6 this includes a mounting frame 18 and a membrane 19 from flexible material mounted therein having a central opening 20. The stripping diaphragm 17 is, mainly in parallel to the center line 3 mentioned before (see FIG. 1) journalled movably to and fro in the apparatus.

Next the operation of the apparatus will be elucidated referring to FIG. 7, in which the apparatus illustrated in FIG. 1 is shown, again extremely schematically, in a number of successive positions.

FIG. 7a shows the starting position. The driving means, including hollow tube 1 and expelling rod 2, are positioned at some distance at the left of the positioning means 5–7. The restricting plate 11 is positioned at some distance above the central positioning means 6. In the position illustrated the central positioning means 6 and the first auxiliary positioning means 5 are substantially at the same level, whereas the other auxiliary positioning means 7 is positioned at a lower level. However, said three positioning means 5–7 are positioned in the same plane, in the embodiment shown a vertical plane. Because the right-hand auxiliary positioning means 7 is positioned at a lower level a leg 21, substantially including lower leg 22, upper leg 23 and knee joint 24, positioned onto the positioning means will also be positioned in the same orientation. This orientation corresponds with the natural, somewhat flexed position of the leg 21.

It is to be noted however, that lower leg 22 and upper leg 23 can change places.

The stripping diaphragm 17 is positioned at some distance from the positioning means.

Figure 7B:
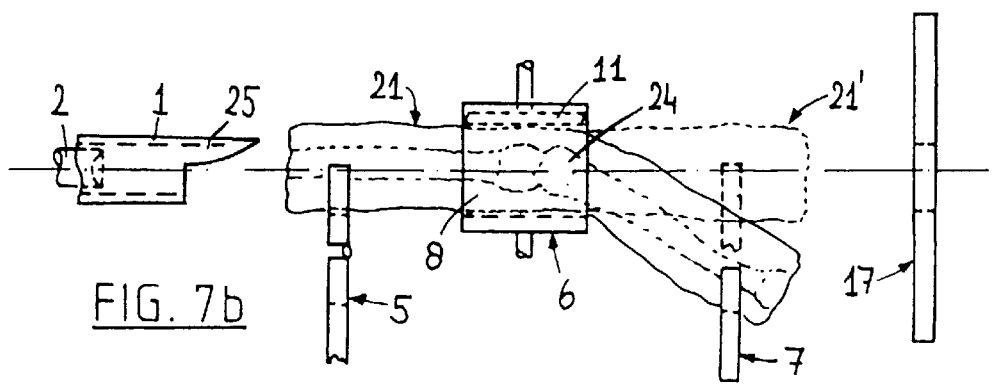

For stretching the leg firstly the restricting plate 11 is moved downward until it pushes the leg 21 at the knee joint 24 against the positioning gutter 8 of the central positioning means 6. This situation is represented in FIG. 7b. Further the right-hand auxiliary positioning means is moved upward then from the position 7 indicated in full lines in FIG. 7b towards the position 7' indicated in dotted lines in FIG. 7b. In the latter position the leg is stretched (dotted position 21').

Figure 7C:
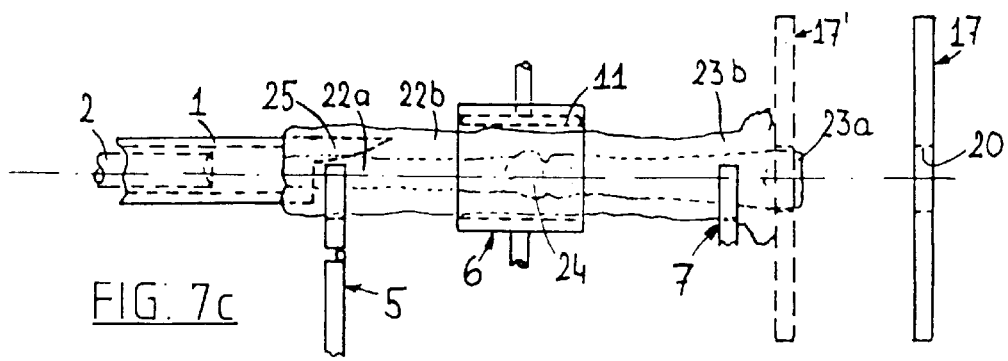

Next, see FIG. 7c, the hollow tube 1, together with the expelling rod 2, is moved to the right such that the end of the hollow tube 1 will engage between the bone 22a and the surrounding meat 22b of the lower leg 22. Now the hollow tube 1 is slid forward over the bone 22a that far until the foremost end of the hollow tube 1 engages the knee joint 24. In this position the projecting part 25 covers the knee-cap not illustrated. Further now the diaphragm is moved from position 17 represented in full lines in FIG. 7c towards position 17' represented in dotted lines, in which position the foremost end of the bone 23a of the upper leg 23 is already partially received in the opening 20 in the membrane 19 (see FIG. 6).

Now stripping the meat 23b from the bone 23a of the upper leg 23 has already been started.

In the situation illustrated in FIG. 7c, in which the hollow tube 1 is still moving towards the position in which the knee-cap will be covered by the projecting part 25 and has already partially received the lower leg 22 (specifically bone 22a) and in which the upper leg 23 has already partially passed the opening 20 in the stripping diaphragm 17, the leg 21 principally is secured against undesired movements, such as buckling sidewardly. Thus the positioning means at least partly can be disengaged. For this reason, in the illustrated embodiment of the apparatus according to the invention, the second auxiliary positioning means 7 is moved downward until it disengages the leg. In this position (see FIG. 7d) the hollow tube 1 and the expelling rod 2 are together pushed further to the right, whereby the bone of the upper leg 23a and next the bone of the lower leg 22a are pushed through the opening 20 of the stripping diaphragm 17. Like this the meat 22b and 23b is stripped from the bones 22a and 23a.

Hereby, the projecting part 25 covering the knee-cap prevents the knee-cap from being torn off of the knee joint 24 together with the meat 22b and 23b, as is undesired because then this knee-cap would remain in the meat and would have to be removed manually later.

Figure 7D:
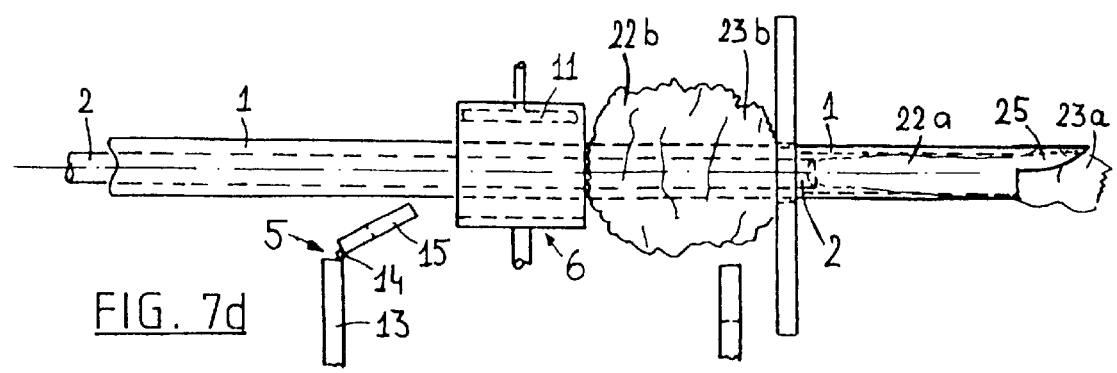
Figure 7E:
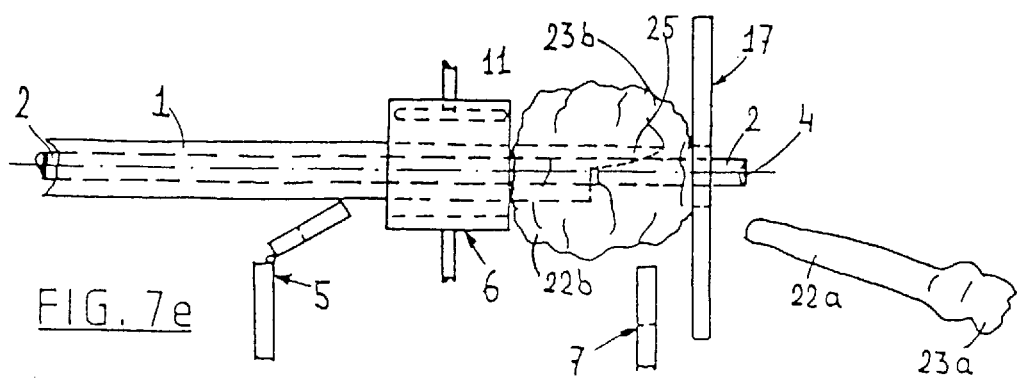
Figure 8:
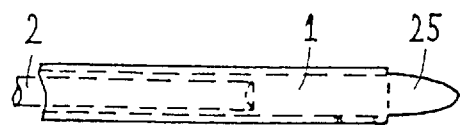
FIG. 8 shows a view according to VIII in FIG. 1.

In FIG. 7d it is further illustrated, that the uppermost part 15 of the first auxiliary positioning means 5 has been pivoted around the pivot axis 14 relative to the lowermost part 13, for enabling the hollow tube 1 to pass. It would be possible also to move downward the first auxiliary positioning means 5, just like the second auxiliary positioning means 7.

After the meat has been stripped fully from the leg in the described manner, whereby the knee-cap is left at the knee joint, firstly the hollow tube 1 is moved back to the left, whereas the expelling rod 2 stays stationary. As a result the recess 4 of the expelling rod 2 engages the bone 22a and the bones 22a and 23a are driven out of the hollow tube 1 and fall down in a discharge gutter not illustrated. After the expelling rod 2 has been retracted to the left also, the stripped meat 22b, 23b can be removed in a way not shown further.

For assuring a proper operation of the apparatus it might be necessary that the knuckle at the end of the lower leg 22 is removed before the leg is processed in the manner described before. Further it can be of advantage to cut the meat entirely in the longitudinal direction of the leg, such that after stripping not a meat collar, but a planar piece of meat is obtained.

The invention is not limited to the embodiment described before, which can be varied widely within the scope of the invention as defined by the claims.

I claim:

1. A apparatus for automated deboning of a leg of a slaughtered poultry, wherein the leg includes an upper leg bone and a lower leg bone with attached meat and a knee joint connecting said upper and lower leg bones, said apparatus comprising:

a mechanism configured to support and straighten said poultry leg;

a stripping diaphragm with a hole defined therein disposed at one end of said mechanism to receive one of said upper or lower leg bones and to strip said meat from said bones as they are pushed through said hole; and a pushing device disposed generally opposite said stripping diaphragm to engage and push said bones through said stripping diaphragm, said pushing device comprising a generally hollow tube longitudinally movable relative to said stripping diaphragm, said hollow tube having a forward end engaging one end of said poultry leg generally between said meat and bone and movable generally up to said knee joint, said hollow tube further comprising a projection member defined on said forward end having a shape so as to move over said knee joint as said hollow tube moves towards said stripping diaphragm, said hollow tube with said projection member disposed over said knee joint subsequently movable through said diaphragm with said leg bones.

2. The apparatus as in claim 1, wherein said pushing device further comprises a rod member longitudinally movable within said hollow tube, said rod member engaging one of said bones and pushing said leg through said stripping diaphragm and subsequently pushing said upper or lower leg bones out of said hollow tube.

3. The apparatus as in claim 2, wherein said rod member and said hollow tube are movable longitudinally relative to each other.

4. The apparatus as in claim 2, wherein said projection member comprises an arcuate extension of a cylindrical wall of said hollow tube.

5. The apparatus as in claim 2, wherein said mechanism to support and straighten said poultry leg comprises movable positioning devices configured to engage said poultry leg on either side of said knee joint.

6. The apparatus as in claim 5, further comprising a movable knee joint restricting device operably disposed between said positioning devices.

7. The apparatus as in claim 6, wherein said positioning devices and restricting device are movable to a position out of engagement with said poultry leg as said pushing device pushes said bones through said stripping diaphragm.

8. An apparatus for automated deboning of a leg of a slaughtered poultry, wherein the leg includes an upper leg bone and a lower leg bone with attached meat and a knee joint connecting said upper and lower leg bones, said apparatus comprising:

means for straightening said poultry leg;

means disposed operably downstream from said straightening means for stripping meat from said leg bones; and means disposed operably upstream from said stripping means for pushing said poultry leg through said stripping means, said pushing means including a generally hollow longitudinal member movable relative to said stripping means, said hollow member having a forward end engaging one end of said poultry leg generally between said meat and bone and movable generally up to said knee joint, said hollow member further comprising a projection defined on said forward end having a shape so as to move over and at least partially cover said knee joint as said hollow member moves through said stripping means, said hollow member with said projection covering said knee joint subsequently movable through said stripping means.

9. An automated process for deboning a leg of slaughtered poultry, wherein the leg includes upper and lower leg bones with attached meat and a knee joint connecting the leg bones, said process comprising the steps of:

supporting and straightening the leg so that the upper and lower bones are generally horizontal;

engaging one end of the straightened leg with a movable hollow member and pushing the hollow member along the leg between the meat and bone generally up to the knee joint of the leg and covering at least partially the knee joint with projection on the forward end of the hollow member that slides over the knee joint, the hollow member thereby deboning at least a portion of the leg; and deboning the remaining portion of the leg by pushing the leg and hollow member with the projection covering the knee joint through a stripping device, the projection on the hollow member at least partially covering and protecting the knee joint from stripping action of the stripping device.

10. The process as in claim 9, comprising engaging and pushing one of said leg bones with a rod that is movable within the hollow member.

* * * * *